United States Patent [19]

Postma

[11] 4,124,986
[45] Nov. 14, 1978

[54] CONCRETE DOCK

[76] Inventor: Randall F. Postma, 2570 Sun Valley, Jenison, Mich.

[21] Appl. No.: 781,787

[22] Filed: Mar. 28, 1977

[51] Int. Cl.$^2$ .......................... E02B 3/20; B63B 35/00
[52] U.S. Cl. ................................... 405/212; 114/219; 405/221; 405/248
[58] Field of Search ................... 61/48, 102, 103, 104; 114/219, 220

[56] References Cited

U.S. PATENT DOCUMENTS

| | | | |
|---|---|---|---|
| 1,030,496 | 6/1912 | Upson | 61/48 |
| 1,358,951 | 11/1920 | Helmich | 61/48 |
| 2,652,694 | 9/1953 | Melges | 61/48 |
| 2,799,494 | 7/1957 | Pollock | 61/48 X |
| 3,084,517 | 4/1963 | Bell | 61/48 |
| 3,222,874 | 12/1965 | Zink | 61/48 |
| 3,345,825 | 10/1967 | Parker | 61/48 |
| 3,961,593 | 6/1976 | Mattews | 61/48 X |

Primary Examiner—Dennis L. Taylor
Attorney, Agent, or Firm—Price, heneveld, Huizenga & Cooper

[57] ABSTRACT

The specification discloses a precast concrete dock and a method and apparatus for installing same. The dock includes a precast concrete platform supported by piling means at one end and including at least one generally U-shaped bumper member with legs projecting laterally beyond the side edges of the platform and being made of a material more resilient and less abrasive than concrete whereby there is less damage to a boat bumping into the bumper member legs than would be the case if a boat bumped into the precast concrete platform. To install the dock, an elongated jig having legs at one end is located out over the water and slidable guide means on the apparatus are located at a point where it is desired to locate pilings. Pilings are lifted into position within the piling guide means and jetted downwardly into the surface below the water by means of an internal passageway. After they have had an opportunity to set, the jig is removed and the precast concrete platform is lifted out over the water and supported at one end by the installed piling means.

37 Claims, 16 Drawing Figures

CONCRETE DOCK

BACKGROUND OF THE INVENTION

The present invention relates to docks and to methods for installing same. The docks are especially of the type used for larger pleasure crafts found at the typical marina. Such docks are 30 to 55 feet in length.

Usually, such docks are made of wood with wooden or steel pipe pilings. Sometimes, steel or aluminum platforms are used to make the docks. Floating docks have been used, but they are generally considered not sufficiently stable for docking larger pleasure crafts.

Usually, a piling is driven or jetted into the ground below the water and the dock platform is then assembled to the pilings. A typical 40 foot dock would require eight wood or steel pipe pilings. One prior artisan has placed the pilings in the water and then erected forms on the pilings and poured concrete into the forms to thereby create a concrete dock supported by the pilings.

Such prior art docks are costly to install and in the case of wood, are subject to considerable wear. Steel platforms tend to be slippery to walk on and are certainly very costly. The concrete dock referred to its very expensive, particularly in view of the cost of pouring the concrete. Also, it is hard on the boats which bump into it and this most certainly necessitates hanging rubber tires along the side of the dock to prevent damage to the boat.

Another factor in the cost of a dock is that of installing the pilings. Pile driving or jetting tends to be a cumbersome, tricky operation. Particularly, in connection with jetting, it is difficult to insure that the piling will end up in its proper desired location and with an appropriate vertical orientation.

SUMMARY OF THE INVENTION

The present invention comprises a precast concrete dock and a method for installing the same with the result that the dock is both highly attractive and economical. The dock includes a precast concrete platform supported at one end by a first support, a seawall or the like, and at the other end by precast concrete piling means. At least one bumper leg projecting upwardly at either side of said platform and extending below said platform but not into the water. The bumper legs project laterally beyond the side edges of the platform and are made of a material which is more resilient and less abrasive than concrete whereby a boat bumping into the bumper legs will not be damaged to the extent that it would be if it bumped the concrete platform.

To install this dock, the installer extends a jig from the first support, such as a seawall, out over the water. The jig includes legs at one end which extend downwardly into the water and rest on the ground below the water. These legs are adjustable relative to the rest of the jig to thereby adjust the height of the jig and insure that it is properly leveled. Located near the end of the jig is at least one frame which has dimensions just slightly larger than those of the piling for the dock. The piling is located in the frame and lowered gradually into the water. Embedding means are used to embed the end of the piling in the ground below the water until it has reached the proper height. When the piling means is in place, the jig is removed and the precast concrete platform is lowered in place and operably secured to the first supporting end and to the piling means at the other end.

These and other objects, features and advantages of the present invention will be more fully understood by reference to the written specification and drawings.

DESCRIPTION OF THE PREFERRED EMBODIMENT

The Dock

Figure 1:
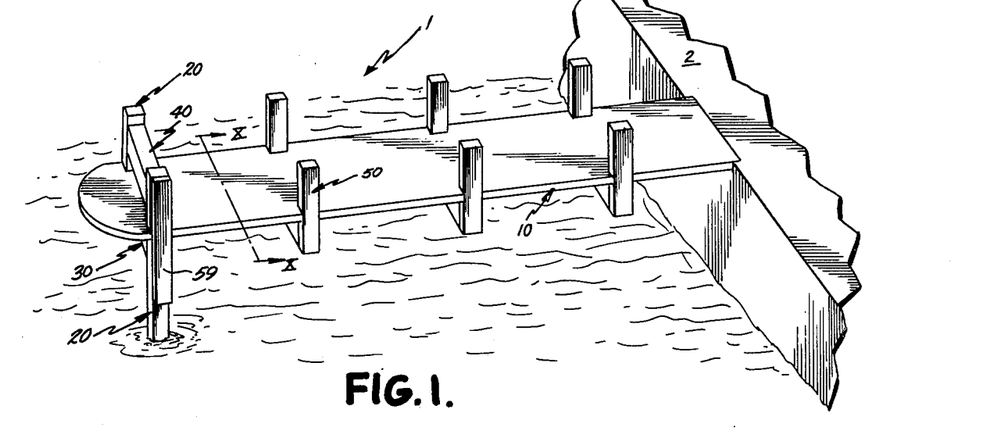
FIG. 1 is a perspective view of a dock made and installed in accordance with the present invention.

In the preferred embodiment, the dock 1 of the present invention includes a precast concrete platform 10 which is supported at one end by a seawall 2 and at the other end by a support beam 30 which extends between a pair of pilings 20 (FIG. 1). An upper cross beam 40 serves to rigidify the assembly and provides an outlet for services. Several generally U-shaped saddle bumpers 50 include protruding legs made of a material more resilient and less abrasive than concrete whereby a boat coming into contact with the dock contacts the saddle bumpers 50 and is not damaged as it would be if it bumped the precast concrete platform 10.

Figure 5:
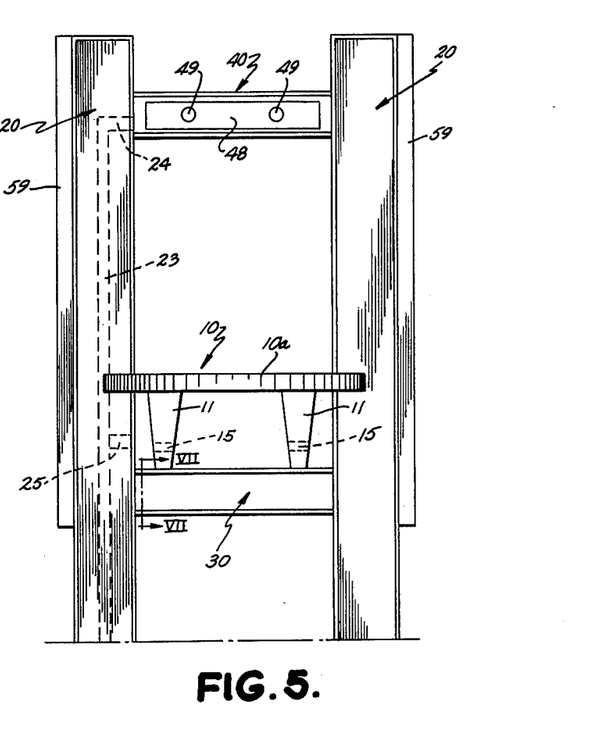
FIG. 5 is an end elevational view of the dock shown in FIG. 1.

Platform 10 comprises an integral precast concrete member approximately four feet wide and thirty to forty feet long or even longer depending on the length of dock desired. As shown in FIG. 1, it has a length of 40 feet. Referring to FIG. 5, it can be seen that platform 10 includes an upper generally flat deck 10a and a pair of spaced, downwardly projecting ribs 11 which serve to rigidify the overall structure.

Figure 2:
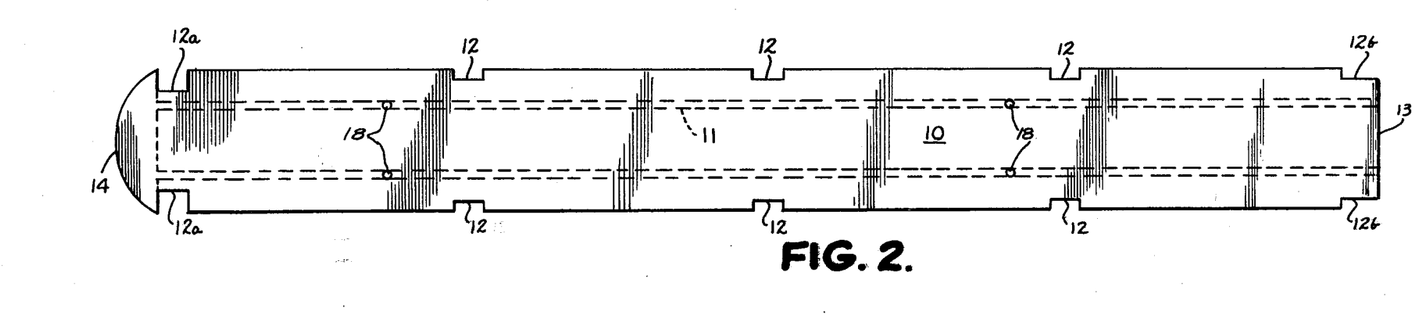
FIG. 2 is a top plan view of the platform portion of the dock of the present invention.

At spaced points along its length, platform 10 includes notches 12 out of its side edges (FIG. 2) for accommodating the legs of the saddle bumpers 50. The notches 12a at the piling supported end of platform 10 are slightly larger than the notches 12 because they have to accommodate the thicker support pilings 20. The notches 12b at the seawall end of platform 10 are cut in at a point spaced from the very end of platform 10 and then extend rearwardly all the way to the end of platform 10 so that they are easier to mount in a receiving well 3 in seawall 2.

The seawall end 13 of platform 10 is squared off (FIG. 2), again because it is easier to shape a receiving well in the seawall 2. The opposite end 14 is rounded, primarily for purposes of appearance. Referring to FIG. 5, it will be seen that each rib 11 of platform 10 includes a passageway 15 cut therethrough at a point below upper deck 10a. This facilitates extending service wiring along the length of platform 10 between the ribs 11. When the wiring reaches the holes 15 which are located in alignment with notches 12a, it can be passed through either passageway 15 and into the internal passageway in piling 20 as will be explained hereinafter.

Platform 10 also includes embedded anchors 18 at spaced points in its upper surface. Eyelets can be threaded into these anchors to facilitate handling during installation.

Figure 3:
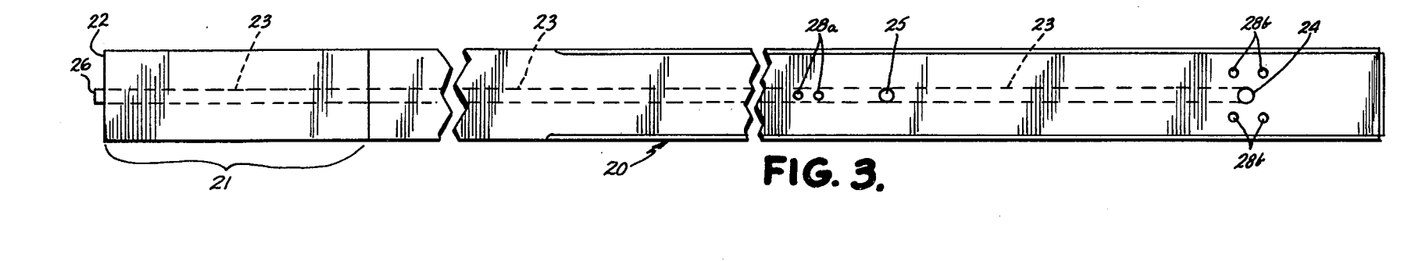
FIG. 3 is a side elevational view of a piling in accordance with the present invention.
Figure 4:
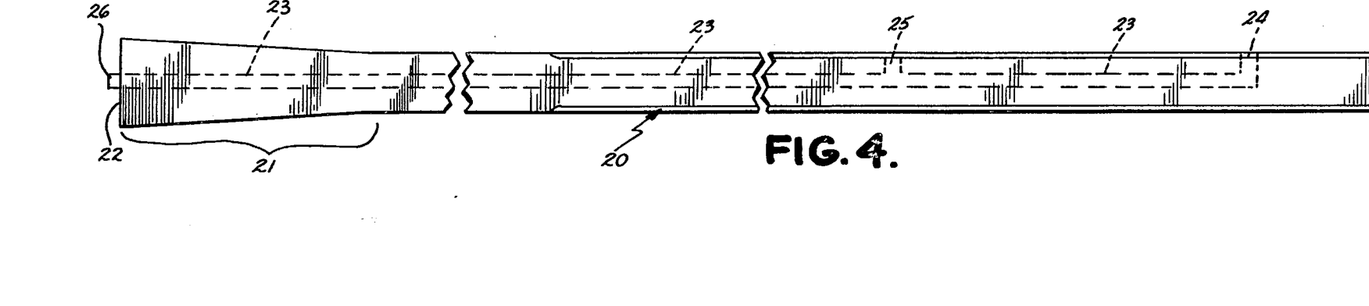
FIG. 4 is a side elevational view of the piling rotated 90° from the position shown in FIG. 3.

Each piling 20 is also made of precast concrete (FIGS. 3 and 4). Each has lateral cross sectional dimensions of approximately 1 foot by 8 inches, and each is approximately 35 feet long. For the bottom three feet of each piling 20, the widest sides flare outwardly gradually as one proceeds toward the bottom (see 21 at FIG. 4). This gradual outward flare makes it more difficult for ice to push piling 20 up out of its anchoring in the ground beneath the water once dirt has settled in around the flared bottom 21. The bottom surface 22 per se is flat so that it rests squarely against dirt which packs in around bottom end 21. Its lateral dimensions are a perfectly square one foot by one foot. This flat, square bottom helps prevent the piling from side slipping during jetting.

A jet tube 23, defining an internal passageway almost throughout the length of piling 20, extends from a top opening 24 at the top of piling 20 all the way to the flat bottom end 22 where it projects slightly at 26. Opening 24 is threaded or includes some other type of fastening means to facilitate fastening a water hose so water can be pumped through jet tube 23 and out through the bottom opening 26 to facilitate sinking the piling in the ground beneath the water surface.

There is an intermediate opening 25 extending from jet tube 23 through a side of piling 20 at a level just below the deck 10a of platform 10 (FIGS. 3, 4 and 5). During the jetting operation, opening 25 is capped and accordingly, is threaded to receive a cap. Once piling 20 is in place, however, the cap is removed and opening 25 is in alignment with passageways 15 in ribs 11. This allows one to pass services through passages 15, into opening 25, upwardly through the upper portion of jet tube 23 and out through the top opening 24 and into upper cross beam 40, as will be explained more fully hereinafter.

Figures 6, 8, 9, 10:
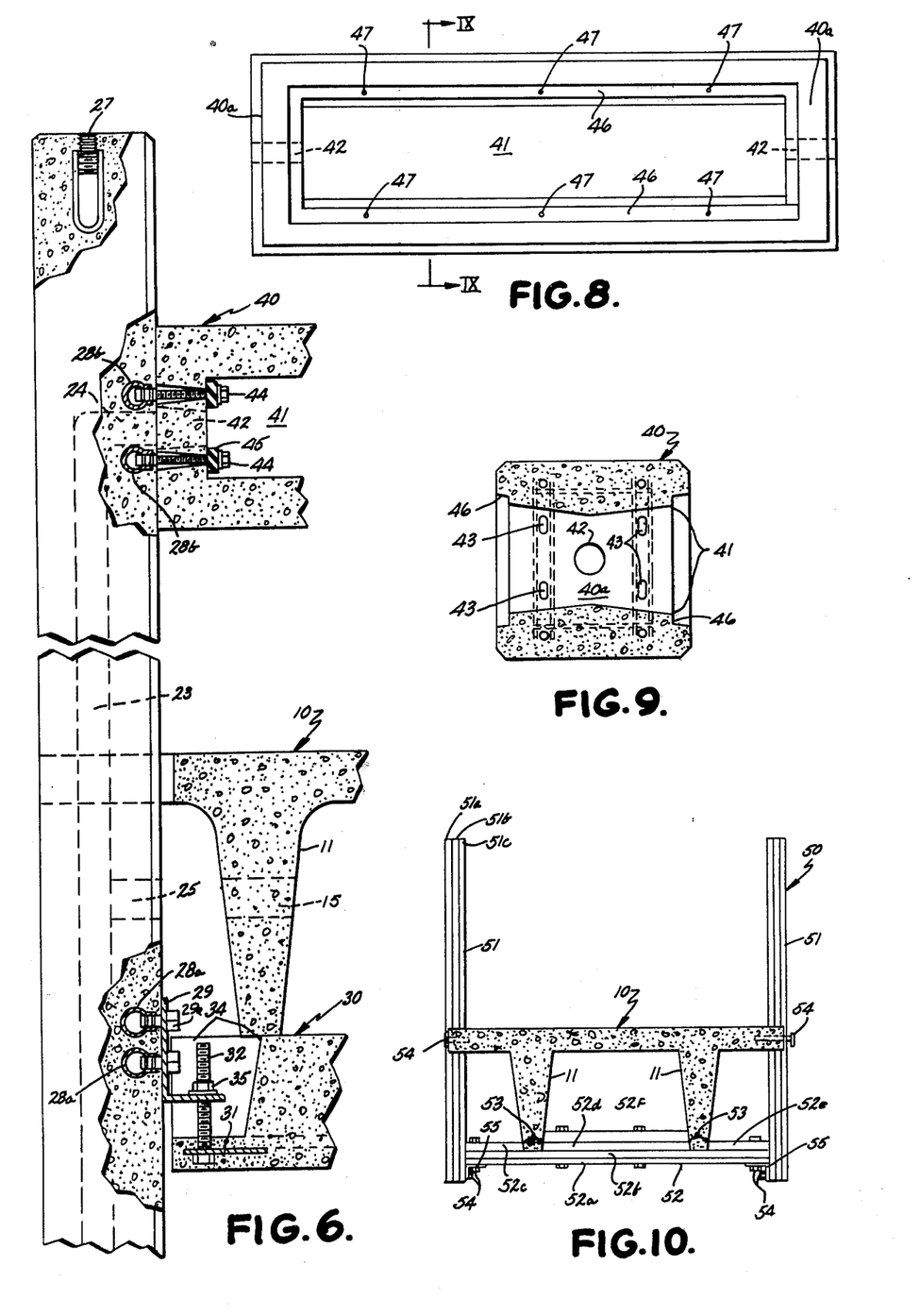
FIG. 6 is a fragmentary partially broken view of the end of the dock.
FIG. 8 is a front elevational view of the upper cross member located at the end of the dock.
FIG. 9 is a cross sectional view taken along plane IX—IX of FIG. 8.
FIG. 10 is a cross sectional view taken along plane X—X of FIG. 1 (usual reinforcement for precast concrete not shown)

The top of each piling 20 includes a threaded anchor 27 for securing an eyelet thereto during the installation operation (FIG. 6). Once piling 20 is installed the eyelet is removed from threaded anchor 27.

A bracket 29 is bolted by suitable bolts 29a into spaced anchors 28a embedded in piling 20 at a location at the bottom of platform 10 to facilitate mounting support beam 30 (FIG. 6). Threaded anchors 28b are located at the top of each piling 20, generally surrounding opening 24 to facilitate mounting top cross beam 40 (FIGS. 3 and 6).

Figure 7:
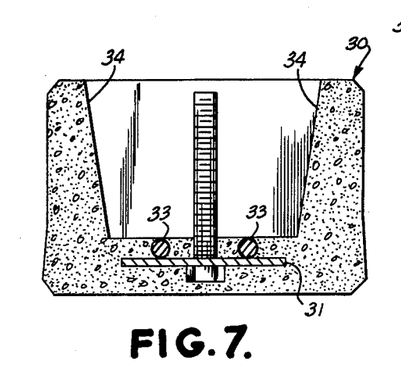
FIG. 7 is a cross sectional view of the platform support taken along plane VII—VII of FIG. 5.

Support beam 30 is a precast concrete member which extends between pilings 20 (FIG. 5). Each includes the usual reinforcement 33 as well as an internal plate 31 at each end (FIG. 7). Extending through an aperture in embedded plate 31 and projecting out of the concrete is a bolt 32. The projecting end of bolt 32 is located in a well or cavity which is molded into each end of cross beam 30 (FIGS. 6 and 7). Bolt 32 coupled with a nut 35 facilitates the adjustable securance of each end of cross beam 30 with its adjacent piling 20. Specifically, bolt 32 extends through an opening in the extending leg of bracket 29 and a nut 35 is threaded onto the end of bolt 32 until cross beam 30 is located at just the right height and is properly leveled.

Upper cross beam 40 is also of precast concrete and includes an open interior 41 which can actually be seen through in the basic member (FIGS. 8 and 9). Extending through each end wall 40a of upper cross beam 40 is a service opening 42 (FIG. 6 as well as FIGS. 8 and 9). Service opening 42 is in line with the upper opening 24 and jet tube 23 and thereby allows passage of the services into the open interior 41 of upper cross beam 40. End wall 40a also includes four spaced fastener openings 43 which allow the passage of bolts into the anchors 28b in piling 20. Each opening 43 is somewhat elongated to allow some play, for reasons explained hereinbelow.

Bolts 44 pass through rubber washers 45 and through fastener openings 43 and are threaded into the receiving anchors 28b in piling 20 (FIG. 6). Rubber washers 45 are sufficiently compressible and resilient that when a boat bumps into dock 1 and causes some lateral shifting of piling 20, washers 45 compress and allow a slight gap to develop at the top or bottom of the interface between upper cross beam 40 and pilings 20. In essence, rubber washers 45 act as shock absorbers and prevent the corners of cross beam 40 from chipping or breaking off when dock 1 is given a jolt.

In this regard, it should be noted that such rubber washers are not necessary in the means for joining support 30 to pilings 20 since support 30 is spaced just slightly from pilings 20 in its assembled position (FIG. 6). It is preferable that such spacing not be employed for upper cross beam 40 since it is clearly visible, being above platform 10. It is cosmetically more desirable that there be no apparent gap between the ends of upper cross beam 40 and pilings 20.

Cast (or molded) into each opposing side of upper cross piece 40, generally around the perimeter of open interior 41, is a slight recess or ledge 46 (FIGS. 8 and 9). Small threaded anchors 47 are embedded in the concrete along the outwardly facing surface of ledge 46 (FIG. 8) to allow one to use screws to fasten a face plate 48 to each side of cross beam 40. Face plate 48 includes suitable electrical outlets, telephone jacks, television antenna jacks or the like 49 which are connected to the services. Plate 48 is then seated in ledge 46 and screwed in place by suitable screws extending into anchors 47 (FIG. 5).

Each saddle bumper 50 includes a pair of spaced legs 51 joined by a base 52 (FIG. 10). Each of the two legs comprises a bolted lamination of three wooden boards, 51a, b and c. The composite thickness of each leg 51, laterally with respect to platform 10, is slightly greater than the lateral depth of each notch 12 in deck 10a so that each leg 51 projects slightly along the side edge of platform 10 even when leg 51 is securely bolted in place within notch 12. Because each leg 51 does so project, and because it is made of a material which is more resilient and less abrasive than concrete, a boat will not be damaged in bumping the leg 51 to the extent it would be if it were to bump into an edge of the precast concrete platform 10. A bolt 54 extends through each leg 51 and into a threaded anchor in the notched edge portion of platform 10. The bolt hole through leg 51 is countersunk so that the head of the bolt will be recessed, as is apparent in the left leg 51 as using FIG. 10, rather than projecting as is shown in the right leg of FIG. 10.

The base 52a of saddle bumper 50 extends beneath platform 10. It includes a pair of spaced rib receiving notches 53 into which the ribs 11 of platform 10 project (FIG. 10). Due to this interaction, saddle bumper 50 is rigidly secure and will not wobble when bumped by a boat.

Base 52, like legs 51, is comprised of a plurality of wooden boards laminated together. Specifically, the bottom layer comprises a board 52a and the second layer comprises a board 52b. The next layer is the layer where the notches 53 begin and it is comprised of three boards, 52c, 52d and 52e. These three boards are cut to appropriate length to leave spaces between them to define the notches 53. A top board 52f is located above center board 52b, between ribs 11, to complete and further rigidify the overall structure. These boards are held together by nut and bolt combinations and at the intersections between the base and legs, by appropriate bracket arrangements. All bolts projecting from the outside of legs 51 are countersunk so their heads are not exposed and cannot gouge a boat.

To compliment the bumper effect of saddle bumpers 50, pieces of wood 59 are bolted to the exposed sides of pilings 20 (FIGS. 1 and 5). Such wood cladding insures that if a boat bumps a piling 20, it will engage a less abrasive wood rather than concrete.

Figure 11:
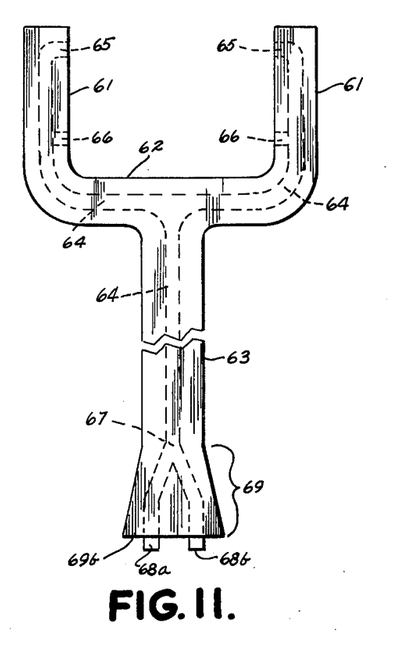
FIG. 11 is an elevational view of an alternative piling means.

FIG. 11 shows an alternative embodiment piling means. Like two spaced pilings 20, the wishbone shaped piling 60 shown in FIG. 11 includes a leg 61 located at either side of the platform 10, within the notches 12a. However, these legs 61 are "upper" legs only and are joined to a cross piece 62. Extending downwardly from the center of cross piece 62 is a bottom leg 63 which is approximately one foot by one foot in lateral cross section. Its bottom portion 69 does include at least two opposed sides which slope gradually outwardly, just as the bottom portions 21 of pilings 20 slope gradually outwardly. This insures that piling 60 will resist the tendency of ice to force it out of the ground beneath the water surface.

Wishbone piling 60 also includes an interior jet tube or passageway 64. In each leg, the internal jet passageway 64 includes an upper opening 65 located above the level of platform 10 and an intermediate opening 66 located just below the level of platform 10 when it is finally installed. The passageway then extends downwardly in each leg 61 and through the cross piece 62 until it meets and extends directly downwardly through bottom leg 63. Towards bottom portion 69, jet tube 64 forks at 67 and extends downwardly and out through bottom openings 68a and 68b. The purpose of providing two bottom openings is that bottom leg 63 is somewhat larger than the normal piling 20, and is not square, being about 1 foot by 16 inches at the bottom. Thus, the use of two spaced jet tube openings 68a and 68b helps to insure that the wishbone piling 60 will jet straight downwardly without getting skewed or drifting as it is jetted.

In use, wishbone piling 60 would function just like two spaced pilings 20. A cross beam 30 would be located just below jet tube openings 66 for supporting platform 10. Platform 10 itself would include an upper deck located above the level of openings 66. Upper cross support 40 would then be located between upper legs 61 in alignment with upper openings 65.

Method and Apparatus For Installation

Figure 12:
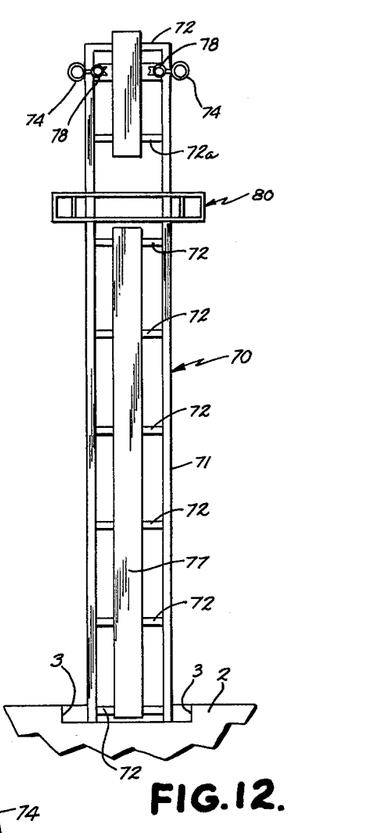
FIG. 12 is a top plan view of the jig used in the installation of the dock.
Figure 15:
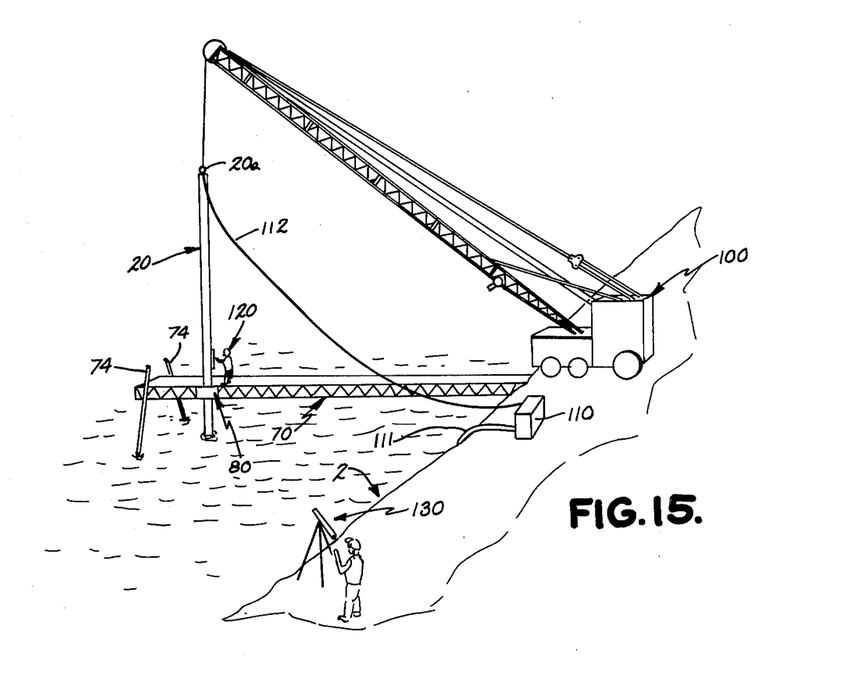
FIG. 15 is a perspective view illustrating the method of installing the precast concrete pilings.

To install the revolutionary precast concrete dock of the present invention, one first uses a crane to locate a jig 70 so that one end is supported on seawall 2 and the other end extends out into the water and is supported on the jig legs 74 (FIGS. 12 and 15). Jig 70 basically comprises a steel truss framework having a pair of spaced sides 71 joined by a plurality of cross pieces 72. Jig 70 must be at least as long as the longest dock which is contemplated will be installed using jig 70.

Figure 13:
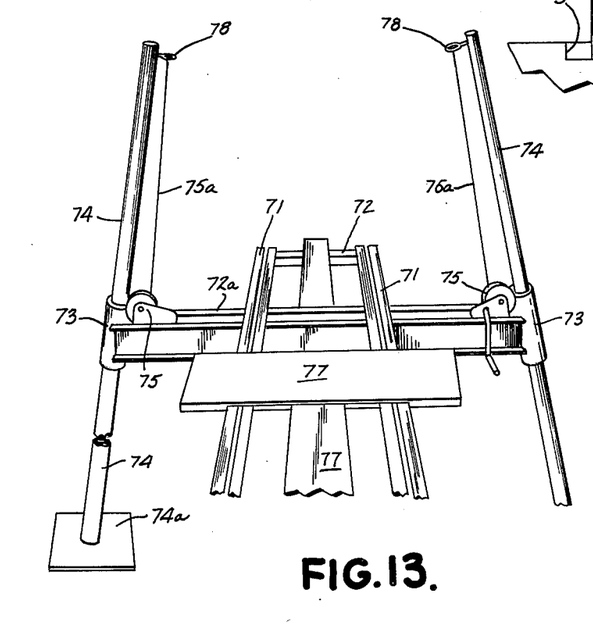
FIG. 13 is a slightly elevated perspective view of the end of the jig showing the adjustable leg supports for the jig.

The supporting legs 74 of jig 70 are slidably located in leg holders 73 which are welded to a cross piece 72a (FIG. 13). An eyelet 78 is secured to the top end of each leg 74 and a winch line 75a, which extends from a winch 75 is anchored in eyelet 78. Winch 75 is mounted on cross pieces 72a. The height and level of jig 70 can be adjusted by winding the winches 75 upwardly or downwardly on their winch lines 75a, since legs 74 slide within their leg holders 73.

Each leg 74 terminates at a flat platform 74a which rests on the bottom below the water. For convenience, jig 70 includes boards 77 laying or bolted thereon to serve as a walking platform.

Figures 14, 16:
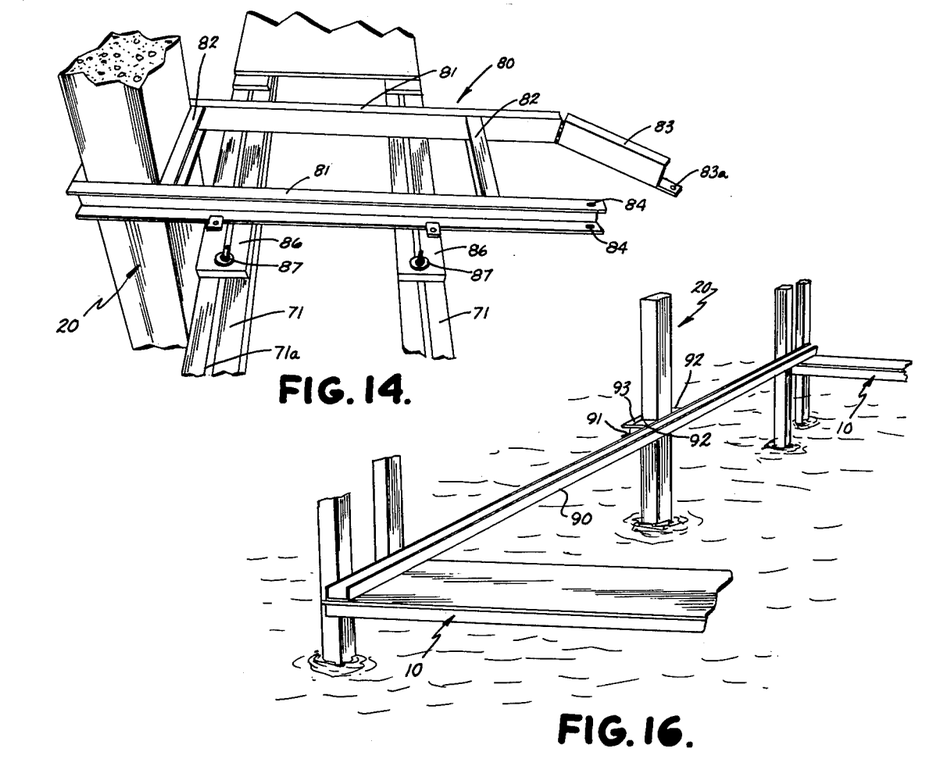
FIG. 14 is a slightly elevated perspective view of the piling guide portion of the jig.
FIG. 16 is a perspective view illustrating the method for installing pilings between adjacent docks.

Slidably mounted to jig 70 is a piling guide fixture 80 (FIG. 12). Piling guide 80 comprises a pair of spaced lateral steel pieces 81 joined by spaced cross pieces 82 (FIG. 14). The members 81 extend laterally across jig 70 and the cross pieces 82 extend between the lateral pieces 81. The cross pieces 82 are spaced inwardly from the ends of lateral pieces 81 and the ends of the lateral pieces are closed off by gates 83, each gate being a short steel member hingedly joined to one end of one lateral member 81 and including at least one projecting tab or flange 83a with the hole therein. When gate 83 is closed, this hole lines up with holes 84 in the end of lateral piece 81 and a pin can be passed through holes 84 and 83a to lock gate 83 shut. The distance between cross piece 82 and gate 83 when it is shut corresponds approximately to the lateral thickness in one direction of a piling 20 and the distance between lateral cross pieces 81 corresponds to the other lateral cross sectional dimension of piling 20. By opening gate 83, a crane operator can swing a piling 20 into position against cross piece 82 and between the projecting ends of lateral pieces 81 and gate 83 can then be shut and locked with a locking pin. Piling 20 is then locked into position and is more easily guided downwardly during the jetting operation.

The position of guide 80 along the length of jig 70 can be altered. Mounting plates 86 are secured to each lateral piece 81 in alignment with each side piece 71 of jig 70. A mounting bolt 87 passes through an aperture in mounting plate 86 and into a slot 71a in each side rail 71. By tightening bolt 87, piling guide 80 is locked against movement and by loosening up bolts 87, piling guide 80 can be slid along the length of jig 70 to any desired position. The operator locates piling guide 80 a distance from the seawall end of jig 70 which is equal to the distance of notches 12a from the seawall end 13 of platform 10.

In operation, a crane 100 is used to first locate jig 70 with one end in seawall 2, in the well 3 in which platform 10 will be located, and with the other end out into the water supported on jig legs 74 (FIG. 15). An installer can place a level on jig 70, laterally and longitudinally, and can adjust the winches 75 to insure that jig 70 is properly leveled. This should insure proper height as well, but proper height can also be checked by a man using a transit 130, standing on seawall 2 and looking out at the end of jig 70. A simple square is placed against the seawall 2 and one side of jig 70 to make sure it extends from the seawall at 90°.

With jig 70 properly located, and with piling guide 80 located at an appropriate distance from the end thereof for accommodating the platform 10 of a particular predetermined length, the installers then insert an eyelet 20a into the threaded anchor 27 at the top of piling 20. A long, flexible jet hose 112 is coupled with the upper opening 24 in jet tube 23 of piling 20. Intermediate hole 25 is capped so that water will not come out of it during the jetting operation. The other end of jet hose 112 is secured to a water pump 110 which is located on the seawall 2 in the vacinity of crane 100. It includes an intake hose 111 which extends into the water adjacent seawall 2.

Piling 20 is then marked with a conspicuous mark which is set a particular predetermined distance from the top of piling 20. This facilitates sinking piling 20 to the proper depth, such that anchor plate 29 is located at just the right height for supporting platform 10 level. The cable of crane 100 is then secured to eyelet 20a and piling 20 is lifted into the air.

The crane operator carries piling 20 out over the water and a man standing on jig 70 helps guide piling 20 into the opening at one end of piling guide 80. When piling 20 is in place against a cross piece 82, the gate 83 is closed and locked shut with a locking pin. The jetting operation can now begin.

Pump 110 is activated and water is pumped through hose 112 and down through the jet tube 23 in piling 20 and out bottom opening 26. Piling 20 is gradually lowered by the crane operator and the man 120 on jig 70 continually checks with a level the vertical orientation of piling 20 as it is lowered into the water and the ground below the water. If piling 20 goes askew slightly, the crane operator in crane 100 lifts it up again and lets it down again until it projects downwardly in proper vertical orientation.

After piling 20 has been lowered to a point where approximately the right height, and with water still flowing through jet tube 23, an installer sites through transit 130 and makes sure the marked line on piling 20 is located at the proper point. If it is not, some adjustment can be made by raising or lowering piling 20 with crane 100. At this point, the flow of water through pump 110 is shut off and the piling is allowed to set, crane still attached, until the ground around the bottom of the piling has had a chance to settle in and firmly grip piling 20 at its bottom. This generally takes ten minutes to a half an hour at the very most.

A second piling 20 is then installed in the same way on the other side of piling guide 80. After the two pilings 20 have been installed, the gates 83 are opened and the crane cable is disconnected from eyelet 20a of the last piling installed. The crane cable is then secured to jig 70 in a conventional manner and then crane 100 is used to lift jig 70 up out of the water. Jig 70 can be immediately relocated at the next adjacent notch in seawall 2 or it can simply be located on land until it is needed again.

Crane 100 is then used to lift cross support 30 out over the water. An installer stands on cross support 30 and helps guide it into position between pilings 20 adjacent the brackets 29 which are already bolted thereto. By appropriate signals to the crane operator, the installer guides first one end bolt 32 into the aperture in the projecting leg of bracket 29 and then secures it with nut 35. Then he follows the same procedure on the other side of cross piece 30 until it is properly installed. A level is used to facilitate adjustment of the respective nuts 35 to insure that cross piece 30 is properly leveled. Transit 130 can be used to insure proper height of cross support 30.

The crane cable is then secured to a harness which is in turn fastened to eyelets threaded into anchors 18 in platform 10 and platform 10 is lifted out of the water and lowered into position with its seawall end 13 located in a notch in seawall 2 and with notches 12a located so as to embrace pilings 20. A man standing on platform 10 as it is lowered helps to guide the notches 12a down over the ends of pilings 20. Platform 10 is then lowered until one end is fully supported at seawall 2 and the other is supported on cross support beam 30 extending between pilings 20.

With platform 10 thus properly supported, upper cross beam 40 can be installed. It is carried out into position by crane 100 and is bolted by the operator to the pilings 20 in the manner previously shown in FIG. 6.

The saddle bumpers 50 are preferably installed in separate pieces. They can be installed when platform 10 is still on shore. Alternatively, platform 10 can be installed first. Then one leg is carried by crane out into position and the leg 51 is bolted to the side of platform 10 in an appropriate notch 12. The opposite leg 51 is similarly carried out to the operator and bolted in place on the other side of platform 10.

Once the two legs 51 are in place, a bracket 55 is bolted to the bottom of each (FIG. 10). Boards 52a and 52b are then placed in position on the brackets 55 and beneath ribs 11. Then, board 52c is placed on top of board 52b between one leg 51 and rib 11. Board 52d, cut to length to fit between the two ribs 11, is then placed between those ribs 11 on top of board 52b. Finally, board 52e is placed on top of board 52b between the other leg 51 and the other rib 11. A final board 52f is cut to length and is fitted on top of board 52d, between ribs 11. The boards are all then bolted together and bolted to the brackets 55 as shown in FIG. 10.

Wiring can then be installed, the conduits extending outwardly beneath platform 10 and preferably between ribs 11. The plug is removed from opening 25 and wiring is passed through passageway 15 and rib 11 into opening 25 and is then fed upwardly into jet tube 23 and out through opening 24 into the open interior 41 of cross beam 40. The cover plates 48 for cross beam 40 are installed after the service wiring has been properly wired to the outlets 49 in plates 48.

After platform 10 has been in position for a time, pilings 20 may settle some. This settling can be compensated for by adjusting nuts 35 on their respective bolts 32.

Often, it is desirable to place one or two pilings between adjacent docks 10, as shown in FIG. 16. To achieve this, a special cross jig comprising a beam 90 is supported on the two adjacent docks 10. Beam 90 includes a guide frame 91 which corresponds to one end of piling guide 80. It includes sides 92 and a gate 93 which can be opened and closed. The length of beam 90 is such that when each end is located adjacent the outside edge of each dock 10, the guide 91 will be located exactly halfway between the two docks 10. The piling 20 is then installed in the same manner as described hereinabove.

Beam 90 may also include cable reinforcement to keep it from bowing and may include a chair which can be slid along its length to make it easier for an operator to work on beam 90 during the jetting operation.

The system works basically the same with the Y-shaped piling 60 of the alternative embodiment. The piling guide 80 is made somewhat larger to accommodate the larger cross section of base leg 63. Jig 70 may have to be modified somewhat so that piling guide 80 is centered with respect to the platform when it is finally laid in the well 3 in seawall 2. The Y-shaped piling is jetted down just like any one of the pilings 20. Once the place, assembly of support beam 30, upper cross beam 40 and platform 10 between the upper legs 61 of piling 60 is conducted in the same manner as the assembly of the same components between two spaced pilings 20. Alternatively, support beam 30 could be eliminated and platform 10 set directly on cross piece 62.

CONCLUSION

In conclusion, the method, apparatus and resulting dock of the present invention is a significant step forward in this art. The entire dock can be installed, including materials and labor, for significantly less than a wooden dock of comparable length. In the present invention, a forty foot dock can be supported on only two concrete pilings, whereas the typical 40 foot wooden dock requires eight pilings. Three or four of the present docks can be installed in a day. Proper level can be readily achieved using the adjustable cross support 30. Yet, the precast concrete structure is achieved without increasing the likelihood of damage of boats, through the use of the unique wooden saddle bumpers of the present invention.

Of course, it is understood that various modifications and alterations can be made without departing from the spirit and broader aspects of the present invention as set forth in the appended claims.

The embodiments of the invention in which an exclusive property or privilege is claimed are defined as follows:

1. A dock comprising: an elongated, precast concrete platform having a generally flat upper surface to provide a suitable walking surface; support means operably connected to one end of said platform for supporting same; piling means operably supporting the other end of said platform and extending downwardly into the water and into the ground below the water; at least one bumper leg operably connected to each side of said platform spaced from either end and said piling and said support means, said bumper leg extending a short distance above and below said platform, but not to the water line beneath said platform; each side of said platform including a notch in the side edge thereof receiving said bumper leg, said leg being wider in cross section than the depth of said notch whereby each of said bumper legs projects laterally beyond the side edges of said platform; each said bumper legs being made of a material more resilient and less abrasive than concrete whereby there is less damage to a boat bumping said bumper member legs than would be the case if a boat bumped said precast concrete platform; said precast concrete platform including at least one integrally formed rib projecting downwardly therefrom and extending longitudinally thereof; each said bumper leg being operably connected to said platform along each side thereof and to said rib whereby said leg is rigidly secured to said platform at two spaced points.

2. The dock of claim 1 in which said bumper leg is operably connected to said rib by a base member extending between and connected to said leg and said rib.

3. The dock of claim 2 in which said base member is a continuous member between two legs on opposite sides of said platform whereby each of said legs is connected to the other as well as to said rib and said side edge of said platform.

4. A dock comprising: an elongated, precast concrete platform having a generally flat upper surface to provide a suitable walking surface; support means operably connected to one end of said platform for supporting same; piling means operably supporting the other end of said platform and extending downwardly into the water and into the ground below the water; at least one bumper leg operably connected to each side of said platform spaced from either end and said piling and said support means, said bumper leg extending a short distance above and below said platform, but not to the water line beneath said platform; each of said bumper legs projecting laterally beyond the side edges of said platform and being made of a material more resilient and less abrasive than concrete whereby there is less damage to a boat bumping said bumper member legs than would be the case if a boat bumped said precast concrete platform; said precast concrete platform including at least one integrally formed rib projecting downwardly therefrom and extending longitudinally thereof; each said bumper leg being operably connected to said platform along each side thereof and to said rib whereby said leg is rigidly secured to said platform at two spaced points.

5. The dock of claim 4 in which said bumper leg is operably connected to said rib by a base member extending between and connected to said leg and said rib.

6. The dock of claim 1 which includes: a support beam; adjustment means operably connecting said support beam to said piling means whereby said support beam can be raised or lowered relative to said piling means; said platform resting on top of said support beam and thereby being operably supported by said piling means, through said support beam.

7. The dock of claim 6 in which said piling means includes a leg extending upwardly on each side of said platform; said adjustment means comprising two separate adjustment means operably connecting said support beam to each of said legs; said platform including a notch in each side edge thereof for receiving each leg of said piling means and another notch in each side edge thereof for receiving each bumper leg, said bumper legs being wider than the depth of said notch whereby said bumper legs project laterally beyond the side edges of said platform.

8. The dock of claim 7 in which each said leg of said piling means includes an internal passageway having a first opening towards said platform at a point below said platform but above the water level and a second opening above said platform whereby services can be brought in beneath said platform passed through said first opening and internal passageway and up out said second opening.

9. The dock of claim 8 in which each said internal passageway extends on down below the level of said first opening through the entire length of said piling means and down to a third opening located in the bottom of said piling means underneath the water whereby said internal passageway can be used to jet water into one of said first and second openings, down through said passageway and out said third opening, with the other of said first and second openings being closed, to thereby facilitate jet installation of said piling means.

10. The dock of claim 8 which includes a cross beam extending between said legs of said piling means and being operably secured to each said leg of said piling means above said platform.

11. The dock of claim 10 in which said piling means comprises two completely separate precast concrete legs extending from each side of said platform downwardly into the water and into the surface below the water; said cross beam being of precast concrete, having two spaced end walls and being operably connected to said separate legs with the outside of said end walls abutting said legs by fasteners passing through said end walls into said legs and each said fastener including a resilient compressible member located on the inside of said end wall whereby some flexing between said legs and said cross beam is facilitated without resulting damage to the ends of said cross beam or said piling legs.

12. The dock of claim 11 in which said support beam is of precast concrete and is suspended between said legs by said adjustment means with its ends spaced slightly from said legs.

13. The dock of claim 10 in which said cross beam is hollow and includes at least one opening from its hollow interior outwardly through one of said end walls, said opening being aligned with said second opening in said piling means leg whereby services passing out through said second opening pass through said opening in said end wall of said cross beam and into the hollow interior thereof for distribution through service openings located in said cross beam.

14. The dock of claim 6 in which said piling means comprises a leg at either side of said platform; said adjustment means comprises a supporting bracket extending inwardly from each said leg and including an aperture therein; said support beam including a bolt extending upwardly from either end portion thereof, into said aperture in said supporting bracket; a nut threaded on each said bolt.

15. The dock of claim 14 in which said support beam comprises a precast concrete member having a well in either end portion thereof, said well being open at the top and out the end of said support but being closed on either side and bottom; said bolt being located in said well whereby it is generally concealed from view, but accessible for adjustment.

16. The dock of claim 1 in which said precast concrete platform includes at least one downwardly projecting reinforcing rib; a pair of said bumper legs on either side of said platform being joined by a base extending beneath said platform and being secured to said pair of legs, said base including a notch in the upper surface thereof, said rib extending into said notch whereby said bumper legs are further rigidified against pivotal movement about the side edges of said platform.

17. The dock of claim 16 in which said platform includes at least two downwardly projecting reinforcing ribs, spaced from one another, said base bumper member including at least two of said notches, one receiving each said reinforcing rib.

18. The dock of claim 16 in which said bumper legs and said bumper base comprise a plurality of boards laminated together; said notch being created by the top lamination layer of said base being made up of at least two boards with a space between the ends thereof to define said notch.

19. The dock of claim 1 in which said piling means includes at least one downwardly extending leg extending downwardly into the water and into the ground below the water, said one downwardly extending leg having generally uniform dimensions except at the bottom, said downwardly extending leg flaring gradually outwardly at the bottom portion thereof whereby said piling resists the tendency of ice forming on the water surface to pull said piling out of the ground beneath the water.

20. The dock of claim 19 in which said downwardly extending leg of said piling means includes a flat bottom surface.

21. The dock of claim 20 in which said piling means comprises at least two completely separate legs extending from each side of said platform downwardly into the water and into the ground below the water, each said leg including said flared out bottom portion and said flat bottom surface.

22. The dock of claim 20 in which said piling means is wishbone in configuration, said downwardly extending leg comprising a single downwardly extending leg extending from a point above the water level downwardly through the water and into the ground below the water and a generally U-shaped yoke located on top of said downwardly extending leg, said yoke including a base member extending to either side of said downwardly extending leg and a pair of upwardly extending legs, each extending to each side of said platform.

23. A dock comprising: an elongated, precast concrete platform having a generally flat upper surface to provide a suitable walking surface; support means operably connected to one end of said platform for supporting same; piling means at the other end of said platform extending downwardly into the water and into the ground below the water; a support beam; adjustment means operably connecting said support beam to said piling means whereby said support beam can be raised or lowered relative to said piling means; said platform resting on top of said support beam and thereby being operably supported by said piling means, through said support beam and being adjustable to height by reason of said adjustment means; said piling means comprises a leg at either side of said platform; said support beam extending generally between said legs; said adjustment means comprises a supporting bracket extending inwardly from each said leg and including an aperture therein; aid support beam including a bolt extending upwardly from either end portion thereof; into said aperture in said supporting bracket; a nut threaded on each said bolt.

24. The dock of claim 23 in which said support beam comprises a precast concrete member having a well in either end portion thereof, said well being open at the top and out the end of said support but being closed on either side and bottom; said bolt being located in said well whereby it is generally concealed from view, but accessible for adjustment.

25. The dock of claim 23 in which said support beam is of precast concrete and is suspended between said legs by said adjustment means with its ends spaced slightly from said legs.

26. A dock comrising: an elongated, precast concrete platform having a generally flat upper surface to provide a suitable walking surface; support means operably connected to one end of said platform for supporting same; precast, concrete piling means operably supporting the other end of said platform and extending downwardly into the water and into the ground below the water; said precast concrete piling means including an upwardly extending leg extending upwardly on each side of said platform, at least one said upwardly extending leg including an internal passageway having a first opening towards said platform at a point below said platform but above the water level and a second opening above said platform whereby services can be brought in beneath said platform, passed through said first opening and internal passageway and up out said second opening; said internal passageway extending on down below the level of said first opening through the entire length of said piling means and down to a third opening located in the bottom of said piling means underneath the water whereby said internal passageway can be used to jet water into one of said first and second openings, down through said passageway and out said third opening, with the other of said first and second openings being closed.

27. The dock of claim 26 in which said piling means includes at least one downwardly extending leg extending downwardly into the water and into the ground below the water, said one downwardly extending leg having generally uniform dimensions except at the bottom, said downwardly extending leg flaring gradually outwardly at the bottom portion thereof whereby said piling resists the tendency of ice forming on the water surface to pull said piling out of the ground beneath the water.

28. The dock of claim 27 in which said downwardly extending leg of said piling means includes a flat bottom surface.

29. The dock of claim 28 in which said piling means comprises at least two completely separate legs extending from each side of said platform downwardly into the water and into the ground below the water, each said leg including said flared out bottom portion and said flat bottom surface.

30. The dock of claim 28 in which said piling means is wishbone in configuration, said downwardly extending leg comprising a single downwardly extending leg extending from a point above the water level downwardly through the water and into the ground below the water and a generally U-shaped yoke located on top of said downwardly extending leg, said yoke including a base member extending to either side of said downwardly extending leg and a pair of upwardly extending legs, each extending to each side of said platform.

31. A dock comprising: an elongated, precast concrete platform having a generally flat upper surface to provide a suitable walking surface; support means operably connected to one end of said platform for supporting same; a precast concrete piling at each side of said platform, operably connected to said platform near the other end of said platform, each said piling extending downwardly into the water and into the ground below the water; a support beam; adjustment means at each end of said support beam, operably connected to one of said pilings whereby said support beam is secured to said pilings and can be raised or lowered relative to said piling means, said adjustment means holding said support beam with its ends spaced from said precast concrete pilings whereby when said pilings shift, said support beam will not chip by reason of contact with said pilings; said other end of said platform resting on said support beam.

32. The dock of claim 31 which includes a precast concrete cross beam having two spaced end walls and being operably connected to said pilings above said platform, with the outside of said end walls abutting said pilings, by fasteners passing through said end walls into said pilings, each fastener including a resilient compressible member located on the inside of said end wall whereby some flexing between said pilings and said precast concrete cross beam is facilitated without resulting damage to the ends of said cross beam or said pilings.

33. A dock comprising: an elongated, precast concrete platform having a generally flat upper surface to provide a suitable walking surface and at least one integrally formed downwardly projecting reinforcing rib; support means operably connected to one end of said platform for supporting same; precast concrete piling means generally at the other end of aid platform, said piling means including a leg extending upwardly on either side of said platform and including means extending downwardly into the water and into the ground below the water; a precast concrete support beam; adjustment means operably connecting each end of said precast concrete support beam to each leg of said piling means, said precast concrete support beam being slightly shorter than the distance between said legs whereby it is suspended between said legs by said adjustment means without engaging said legs; a plurality of bumper members operably connected to said platform, each said bumper member being generally U-shaped in configuration, having a leg located on either side of said platform and a base joining said legs and extending beneath said platform; said base of each said bumper member including a notch therein, said platform rib extending into said notch; each of said bumper member legs projecting laterally beyond the side edges of said platform and being made of a material more resilient and less abrasive than concrete whereby there is less damage to a boat bumping said bumper member legs than would be the case if a boat bumped said precast concrete platform.

34. The dock of claim 33 in which each said leg of said piling means includes an internal passageway having a first opening towards said platform at a point below said platform but above the water level and a second opening above said platform whereby services can be brought in beneath said platform passed through said first opening and internal passageway and up out said second opening.

35. The dock of claim 34 in which each said internal passageway extends on down below the level of said first opening through the entire length of said piling means and down to a third opening located in the bottom of said piling means underneath the water whereby said internal passageway can be used to jet water into one of said first and second openings, down through said passageway and out said third opening, with the other of said first and second openings being closed, to thereby facilitate jet installation of said piling means.

36. The dock of claim 35 which includes a cross beam extending between said legs of said piling means and being operably secured to each of said leg of said piling means above said platform; said cross beam being of precast concrete, having two spaced end walls and being operably connected to said legs of said piling means, with the outside of each end wall abutting one of said legs, by fasteners passing through said end walls into said legs and each said fastener including a resilient compressible member located on the inside of said end wall whereby some flexing between said legs and said cross beam is facilitated without resulting damage to the ends of said cross beam or said piling legs.

37. A dock comprising: an elongated, precast concrete platform having a generally flat upper surface to provide a suitable walking surface; support means operably connected to one end of said platform for supporting same; piling means operably supporting the other end of said platform and extending downwardly into the water and into the ground below the water; at least one bumper member operably connected to said platform, said bumper member being generally U-shaped in configuration, having a leg located on either side of said platform and a base joining said legs and extending beneath said platform; each of said bumper members legs extending a short distance above and below said platform; and each said bumper member leg projecting laterally beyond the side edges of said platform and being made of a material more resilient and less abrasive than concrete whereby there is less damage to a boat bumping said bumper member legs than would be the case if a boat bumped said precast concrete platform.

* * * * *

UNITED STATES PATENT AND TRADEMARK OFFICE
CERTIFICATE OF CORRECTION

PATENT NO. : 4,124,986
DATED : November 14, 1978
INVENTOR(S) : Randall F. Postma It is certified that error appears in the above-identified patent and that said Letters Patent are hereby corrected as shown below:

Column 12, line 57:

"aid" should be --said--

Column 14, claim 33, line 26:

"aid" should be --said--

Column 16, claim 37, line 8:

"members" should be --member--

Signed and Sealed this

Third Day of July 1979

[SEAL]

Attest:

Attesting Officer

LUTRELLE F. PARKER
*Acting Commissioner of Patents and Trademarks*